United States Patent

Focke et al.

[11] Patent Number: 5,975,837
[45] Date of Patent: Nov. 2, 1999

[54] LIFTING APPARATUS FOR HANDLING OBJECTS PLUS DEVICE FOR LOADING AND UNLOADING PALLETS

[75] Inventors: Heinz Focke, Verden; Harald Freudenberg, Marklohe, both of Germany

[73] Assignee: Focke & Co. (GmbH & Co.), Verden, Germany

[21] Appl. No.: 08/886,757

[22] Filed: Jul. 1, 1997

[30] Foreign Application Priority Data

Jul. 3, 1996 [DE] Germany .................. 196 26 826

[51] Int. Cl.⁶ ........................... B65G 57/04
[52] U.S. Cl. ............... 414/792.9; 294/65; 294/119.1
[58] Field of Search .................... 294/65, 81.54, 294/67.33, 119.1; 414/790.9

[56] References Cited

U.S. PATENT DOCUMENTS

| 3,493,258 | 2/1970 | Wyrough | 294/81.1 X |
| 4,723,353 | 2/1988 | Monforte | 29/568 |
| 4,787,812 | 11/1988 | Göpfert | 294/65 X |
| 5,199,845 | 4/1993 | Hirashima et al. | 414/744.1 |
| 5,372,472 | 12/1994 | Winski et al. | 414/790.9 X |
| 5,562,403 | 10/1996 | Winski | 414/790.9 X |

FOREIGN PATENT DOCUMENTS

| 92534 | 10/1983 | European Pat. Off. |
| 7541251 | 4/1976 | Germany . |
| 3042174 | 6/1982 | Germany . |
| 291956 | 10/1983 | Germany . |
| 2615260 | 10/1986 | Germany . |
| 3638991 | 5/1988 | Germany . |
| 3417736 | 5/1989 | Germany . |
| 3926121 | 2/1991 | Germany . |
| 4001513 | 7/1991 | Germany . |
| 4122953 | 1/1993 | Germany . |
| 3722299 | 11/1995 | Germany . |
| 4407324 | 5/1996 | Germany . |

OTHER PUBLICATIONS

Palettieren mit Industrierobotern, Jurgen Lietz, Fordern und Heben, 41, 1991, Nr. 12, S.1000–1001.
Zusammenfuhren und Verteilen, Fordermittel Journal Nov. 1988, S. 30.

*Primary Examiner*—Janice L. Krizek
*Attorney, Agent, or Firm*—Sughrue, Mion, Zinn, Macpeak & Seas, PLLC

[57] ABSTRACT

Lifting apparatus, especially a palletizing device, with a lifting head (13) attached to an articulated arm (12) for receiving, transporting and setting down objects, especially cardboard boxes. The cardboard boxes or other objects are to be set down on pallets (10). For increased efficiency, a plurality of pallet stations is formed in the working area of the palletizing device (11) for depositing cardboard boxes. In order to transport empty pallets (10) from time to time to the pallet stations, an additional apparatus can be put on the lifting head (13), namely a pallet grab (36). The latter is actuated from the lifting head (13) in the sense of opening and closing grasping members, namely carrying legs (55, 56).

8 Claims, 6 Drawing Sheets

LIFTING APPARATUS FOR HANDLING OBJECTS PLUS DEVICE FOR LOADING AND UNLOADING PALLETS

SPECIFICATION

The invention relates to a lifting apparatus with a receiving means, arranged on lifting gear, for objects, especially a robot with an extension arm configured as an articulated arm and a lifting head attached to same for loading and unloading pallets. In addition, the invention relates to a device for loading and unloading pallets, especially where a lifting apparatus of this type is used.

The handling of bulky objects in packaging technology, especially the handling of bulk packaging such as cardboard boxes, is being increasingly automated. This is true, too, of the realm of loading and unloading pallets with cardboard boxes of this type.

In known fashion, so-called palletizing devices are used for the automatic loading or unloading of pallets. The palletizing devices are robots with an articulated arm at the end of which is arranged a receiving means, usually a lifting head, for grasping at least one cardboard box or the like. Due to the movement potential of the articulated arm, the cardboard boxes can be positioned in layers in predetermined relative positions on the pallet or removed from same. The lifting head is here predominantly provided with suction members which grip the cardboard box on its upper side with the effect of negative pressure.

The invention goes a step further in the automation of handling processes, the necessary movement of the (empty) pallets being, for instance, also automated.

The object underlying the invention here is to propose a lifting apparatus which, simply constructed and simple to operate, is in a position to grasp and transport different objects, especially alternately objects such as cardboard boxes and (empty) pallets.

In fulfillment of this object, the lifting apparatus according to the invention is characterised by an additional receiving means which may be detachably joined to the receiving means and serves to grasp and hold other objects, especially to handle pallets.

The inventive idea consists in providing for the usual transporting and handling procedures a standard receiving means, especially a lifting head with suction members, on the robot's extension arm. For carrying out special tasks, especially for handling pallets, an additional receiving means is temporarily attached to the lifting head, which receiving means is designed in such a way that it is suitable for grasping and holding the pallets or other objects. On a lifting head with suction members, this additional receiving means is preferably grasped and held by said members.

The additional receiving means is provided with holding members which are adapted to the respective object which is to be grasped, for example to the configuration of a pallet. These movable holding members are, according to a further feature of the invention, actuated by actuating members on the lifting head, especially by pressure medium cylinders attached to same, moved into a holding or opening position.

The invention relates, in addition, to a device with a lifting apparatus, especially a palletizing device or robot for loading or unloading pallets, a plurality of object conveyors being allocated according to the invention to a centrally positioned palletizing device, which conveyors open into its working area, a plurality of pallet stations in addition being formed in this working area for loading by the robot.

Further features of the invention refer to the design of the lifting head or the additional receiving means on the one hand and the configuration of the device for loading and unloading pallets on the other hand.

Figure 1:
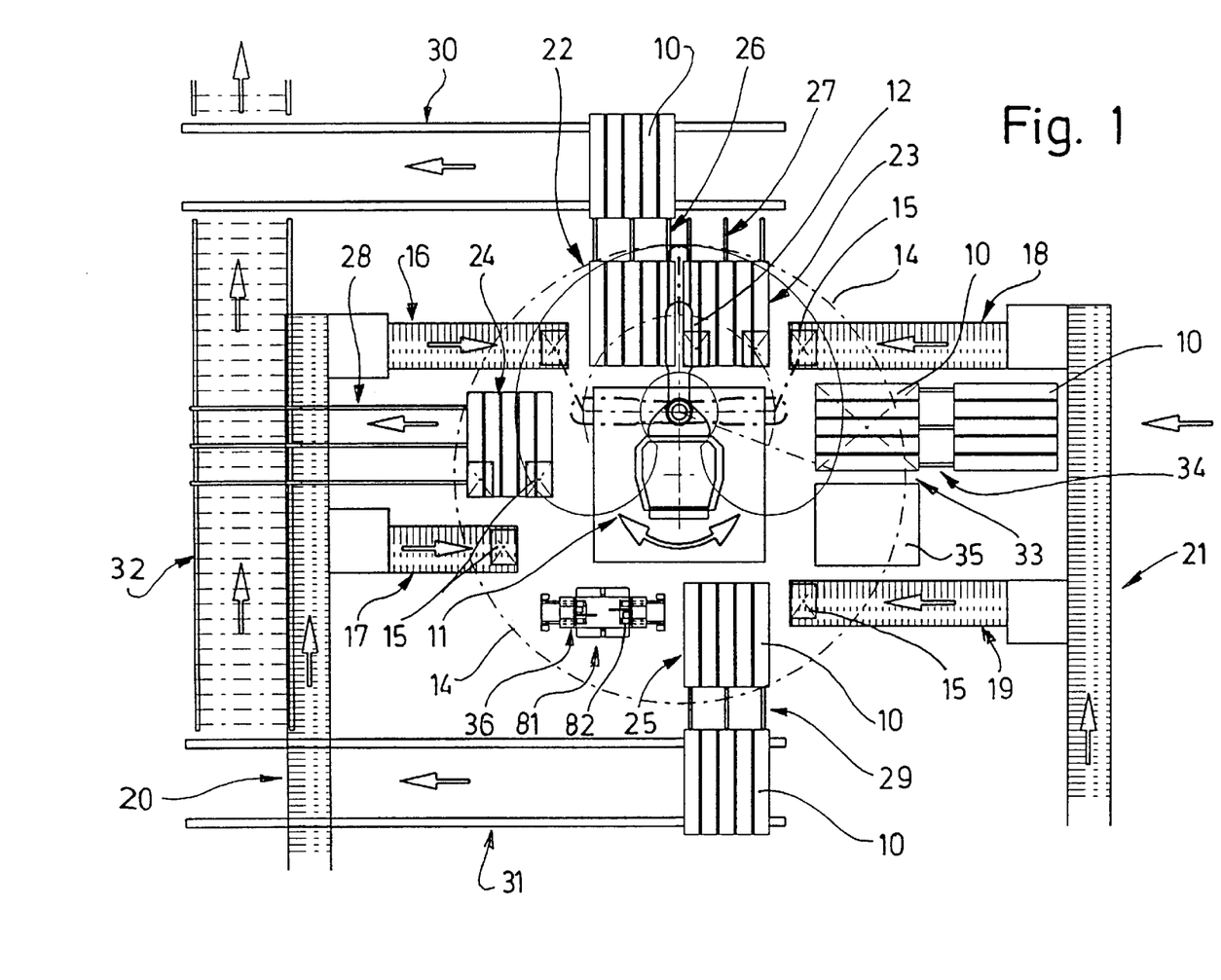
FIG. 1 a device for loading and unloading pallets with objects, namely cardboard boxes, in diagrammatic plan view, FIG. 2 a receiving means for a palletizing device, namely a lifting head, in side view, in partial section, FIG. 3 the lifting head according to FIG. 2 in a transverse view, likewise in partial section, FIG. 4 an additional receiving means, namely a pallet grab, in diagrammatic plan view, FIG. 5 the additional receiving means in mounted position on the lifting head according to FIG. 2 and FIG. 3, in side view, FIG. 6 a detail of the lifting head with additional receiving means in side view, on an enlarged scale.

Embodiments of the invention, given by way of example, are explained in greater detail below with the aid of the drawings. These show:

FIG. 1 shows a device or installation for loading pallets 10 with objects in diagrammatic plan view. The installation is set up for completely automatic operation.

The central member of the installation is a palletizing device 11 which is positioned in the middle of the installation. The palletizing device 11 is a robot which is rotatable around an upright axis. A receiving means or a lifting head 13 is attached to an articulated arm 12 which may be moved up and down, preferably in the embodiment according to FIG. 2 and FIG. 3. The lifting head 13 is not shown in FIG. 1 for reasons of clarity.

The palletizing device 11 has a working area 14, predetermined by its turning capacity around a vertical axis, and which is marked in FIG. 1 by a dot-dash circular line. Within this working area 14, objects to be handled can be grasped by the lifting head 13, namely lifted up or set down, in different positions and on different levels.

On the present embodiment, cardboard boxes 15 led in individually are to be set down on pallets 10, namely stacked up in a plurality of layers. The cardboard boxes 15 are conveyed by a plurality of cardboard box conveyors, in this case four, 16, 17, 18, 19, into the working area. The cardboard box conveyors 16 . . . 19 therefore terminate in each case in the working area 14, so that the cardboard box 15 held ready at the end of the respective cardboard box conveyor 16 . . . 19 can be grasped by the palletizing device 11 or its lifting head 13.

The cardboard boxes 15 are passed by feed-in conveyors 20, 21 to the cardboard box conveyors 16 . . . 19. In the present case, two parallel feed-in conveyors 20, 21 are provided, running on both sides of the working area 14 and outside same. Two cardboard box conveyors 16, 17 or 18, 19 are each allocated to the one and the other feed-in conveyor 20, 21. The cardboard box conveyors 16 . . . 19 extend as branches of the feed-in conveyors 20, 21 transversely to same, likewise parallel to one another. The cardboard boxes 15 led in can differ in respect of their content, so that sorting into types takes place by means of the feed-in conveyors 20, 21 or the cardboard box conveyors 16 . . . 19.

A plurality of pallet stations, in the present case four 22, 23, 24 and 25, is formed in the working area 14. In the region of one of this sort of pallet station 22 . . . 25 an (initially empty) pallet 10 is held ready to be loaded gradually with cardboard boxes 15.

A pallet conveyor 26, 27, 28, 29 is allocated to each pallet station 22 . . . 25. These pallet conveyors are conveyor belts, oriented radially or approximately radially to the working area 14, and which each carry a loaded pallet 10 away from the region of the pallet station 22 . . . 25 and pass it on to a conveyor. In the present case, two parallel intermediate conveyors 30, 31 are provided, running outside the working area 14 and which set the (loaded) pallets 10 down on an onward conveyor (32). In the embodiment shown in FIG. 1, the pallets 10 of pallet station 24 are carried by the pallet conveyor 28 directly to the onward conveyor 32. The intermediate conveyor 31 is allocated to pallet station 25. On the side of the working area 14 lying opposite the pallet station 25, two pallet stations 22, 23 are arranged directly beside one another. These are both connected to the intermediate conveyor 30 via the pallet conveyors 26, 27. Pallet conveyor 28 is positioned in such a way that the pallets 10 can be transported by same in a plane above the feed-in conveyor 20.

The pallet stations 22 . . . 25 are positioned irregularly inside the circular working area 14. One reason for this is the installation of a stacking station 33 for empty pallets 10. An adequate stock of empty pallets 10 is maintained here, in such a way that in each case an upper pallet 10 can be grasped, i.e. by the palletizing device 11. The empty pallets 10 are set down outside the working area 14 on a charging conveyor 34, as a stack. The latter is then carried altogether by the charging conveyor into the stacking station 33, once this station has been emptied.

Beside the stacking station 33 for the empty pallets 10, there is formed—likewise at least partially within the working area 14—a stock of intermediate layers 35. These are intermediate layers made of paper, cardboard or foil, stacked the one above the other. In each case, an intermediate layer is picked up by the palletizing device 11 and laid down on a complete layer of cardboard boxes 15 on a pallet.

Finally, a station for an additional receiving means, yet to be described, namely for a pallet grab 36, is formed in the working area 14. The station mentioned consists of a fixed support structure 37 for this pallet grab 36.

The palletizing device 11 is preferably equipped with a lifting head 13, as is shown in detail in FIGS. 2 to 6.

Figure 2:
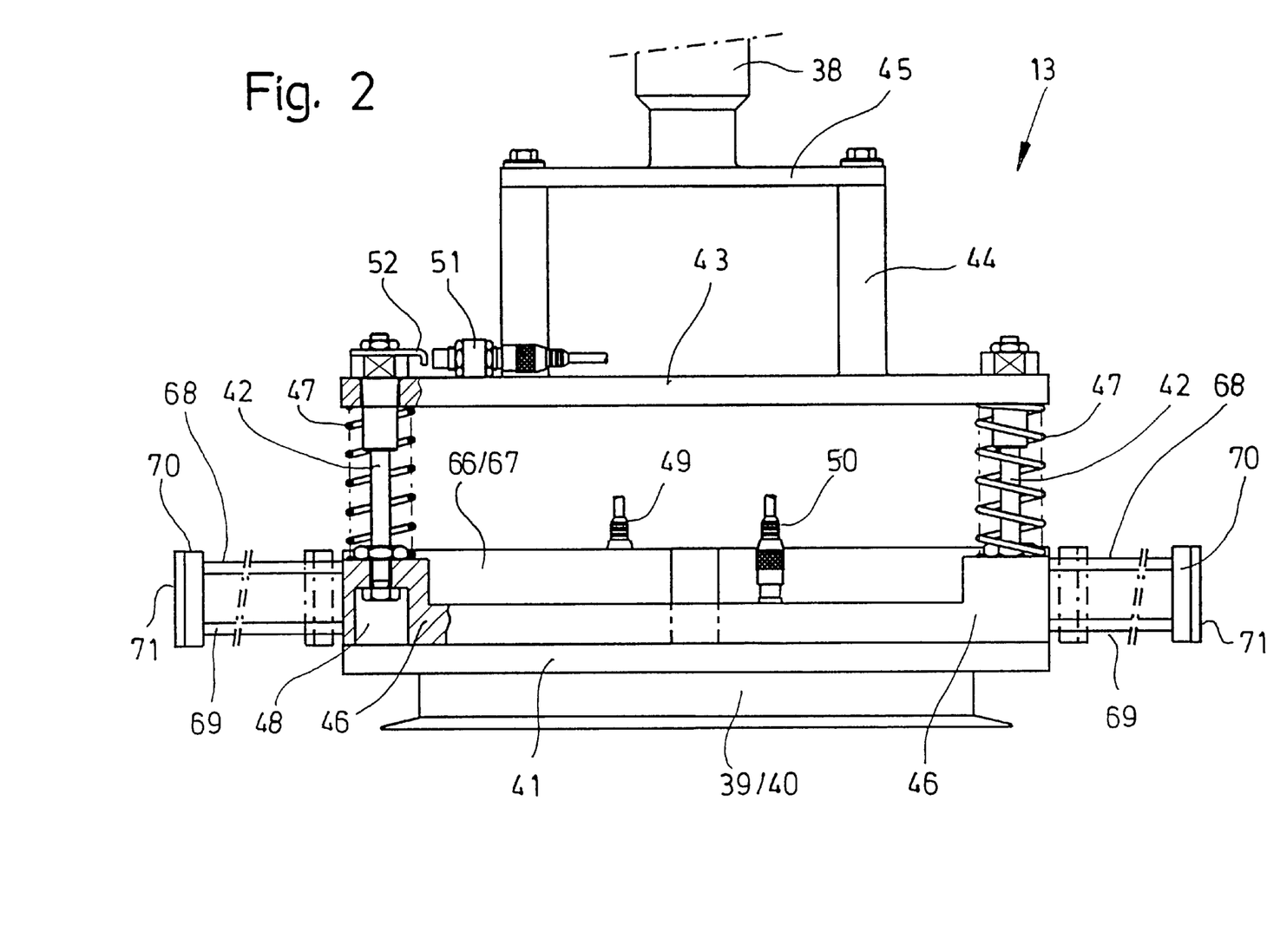
Figure 3:
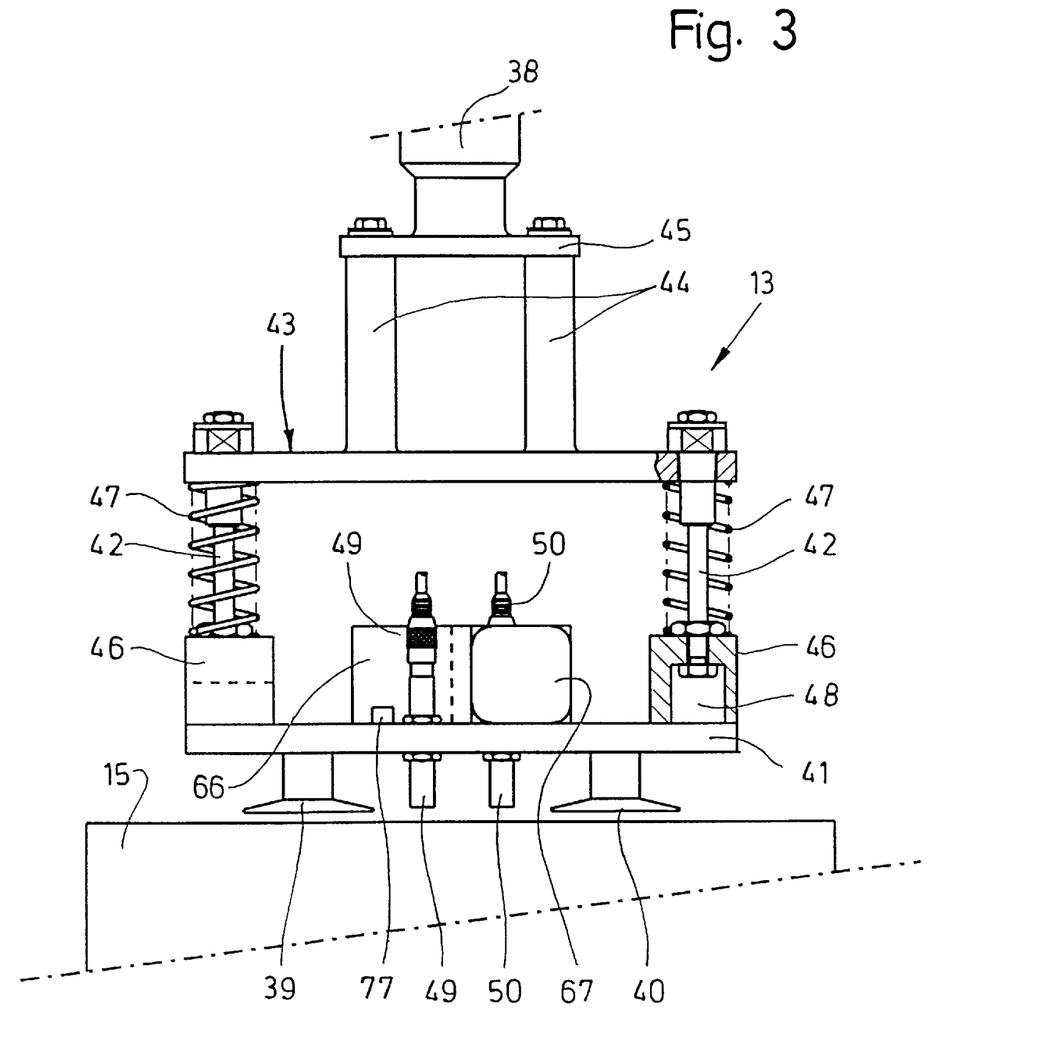

The lifting head 13 is attached to an upright lifting lug 38 on the end of the articulated arm 12. For grasping the objects or cardboard boxes 15, there are located on the underside of the lifting head 13 suction members which are connected to a negative pressure source. On the embodiment, given by way of example and shown here, these members are elongated, parallel suction strips 39, 40. These come in each case into contact with the upper side of a box 15, in order to grasp same.

The lifting head 13 is in the present case provided with a main plate 41. The suction strips 39, 40 are attached to the underside of this plate. The main plate 41 is connected to an intermediate carrier, namely a carrying plate 43, via carrying members, namely via four carrying bolts 42 attached to the corners. On the upper side of the carrying plate, there are located upright connecting rods 44 which connect the lifting head 13 to a flange 45 on the underside of the lifting lug 38.

The main plate 41 is mounted to be resiliently movable in an upwards direction, namely on the carrying plate 43. The carrying bolts 42 are anchored with their lower ends in rib-like support bodies 46 which are attached to the upper side of the main plate 41 on two edges lying opposite one another. The opposite upper ends of the carrying bolts 42 are mounted to be movable in the carrying plate 43. On the support bodies 46, on the one hand, and on the underside of the carrying plate 43, on the other hand, are supported resilient members, i.e. compression springs 47 which in each case surround the carrying bolts 42. When the lifting head 13 is set down on an object, the main plate 41 is thus resiliently moved upwards, against the pressure of the compression springs. The lower ends of the carrying bolts are securely anchored in a cavity 48 of the carrying bodies 46.

On the main plate 41 there are mounted handling and control members for the lifting head 13, including lines (not shown) for supplying the suction strips 39, 40 with negative pressure. Furthermore, in the present case, (optoelectronic) sensors 49, 50 are mounted on the main plate 41, which sensors control the lifting head 13, namely generate a control signal if an object or cardboard box 15 has been grasped. The sensors 49, 50 on the underside projecting from the main plate 41, show the presence or the grasping of a cardboard box 15 in that both sensors 49, 50 are activated.

A further control member, namely a non-contact object detector, or so-called initiator 51, is mounted on the carrying plate 43. This initiator 51 generates a control signal if the lifting head 13 sets down on the upper side of an object or cardboard box 15. A probing vane 52 is allocated to the initiator 51. This vane is secured in the region of a carrying bolt 42. Upon the resilient upwards movement of the main plate 41 and thus of the carrying bolts 42, the probing vane 52 is moved relative to the initiator 51, generating a control signal.

A further characteristic feature of the lifting head 13 consists in the fact that it can be set up to receive and transport (empty) pallets 10. To this end, an additional receiving means, namely the pallet grab 36, is temporarily attached to the lifting head 13. The grab is configured in such a way that the lifting head 13 can automatically pick up and hold the pallet grab 36 and set it down after the pallet has been transported, The actuation of the pallet grab is also effected from the lifting head 13.

Figure 4:
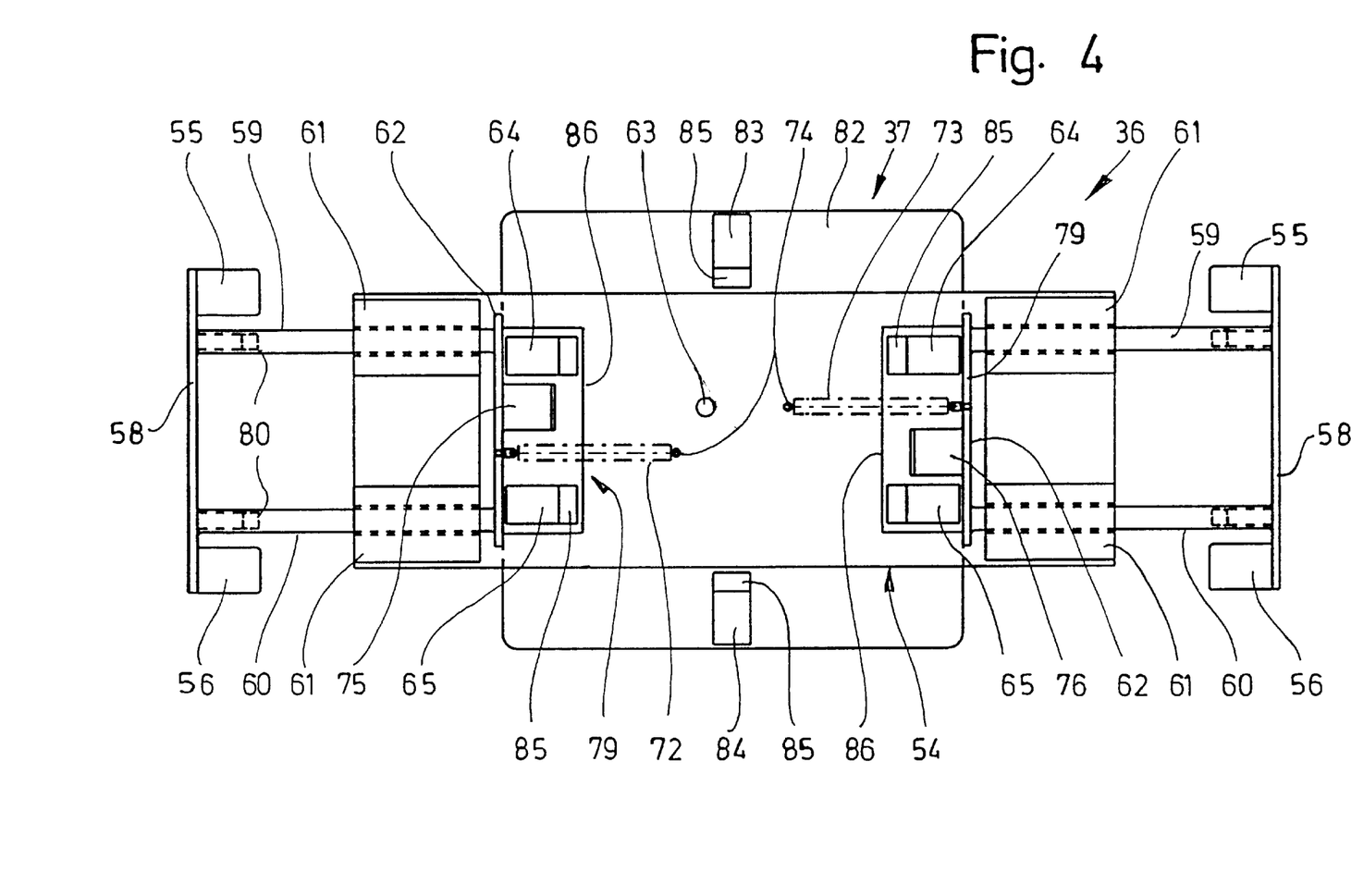

The pallet grab 36 consists of a central plate-shaped carrying unit 54. To this unit there are attached grasping or holding members which in each case serve to grasp one pallet 10. In the present case, these members are carrying legs 55, 56 which grasp underneath the pallet 10 or enter a side opening 53 of a usual pallet (dot-dash position in FIG. 5). Upper edge walls of the pallet 10 lie on the carrying legs 55, 56 during an upward movement of the lifting head 13 with pallet grab 36. These legs are connected by upright webs 57 with a transverse, plate-shaped crosshead 58 This is in turn attached to the end of stay bars 59, 60 and connects them to one another.

The stay bars 59, 60 are displaceable in a longitudinal direction as a support structure for the grasping members which grasp the pallets on the upper side of the plate-shaped carrying unit 54. For this purpose, guide pieces 61 are attached at opposite end regions of the elongated, rectangular carrying unit 54, with continuous boreholes for slidingly mounting and guiding the stay bars 59, 60.

The ends of the stay bars 59, 60 lying opposite the crosshead 58 are connected to one another by a butt plate 62. On this plate, actuating members become effective to push the stay bars 59, 60 and, with them, the carrying legs 55, 56 as grasping members. To grasp a pallet 10, the carrying legs 55, 56, actuated in pairs, are moved away from one another (position shown by unbroken lines in FIG. 5). In this relative position, the receiving unit, consisting of lifting head 13 and pallet grab 36, can be driven over a pallet 10 and lowered (FIG. 5) especially in the region of a stacking station 33. By moving in the stay bars 59, 60, the grasping members, namely carrying legs 55, 56, are brought into a receiving position for the pallet 10. The latter can now be lifted up by the palletizing device 10 and transported.

Figure 5:
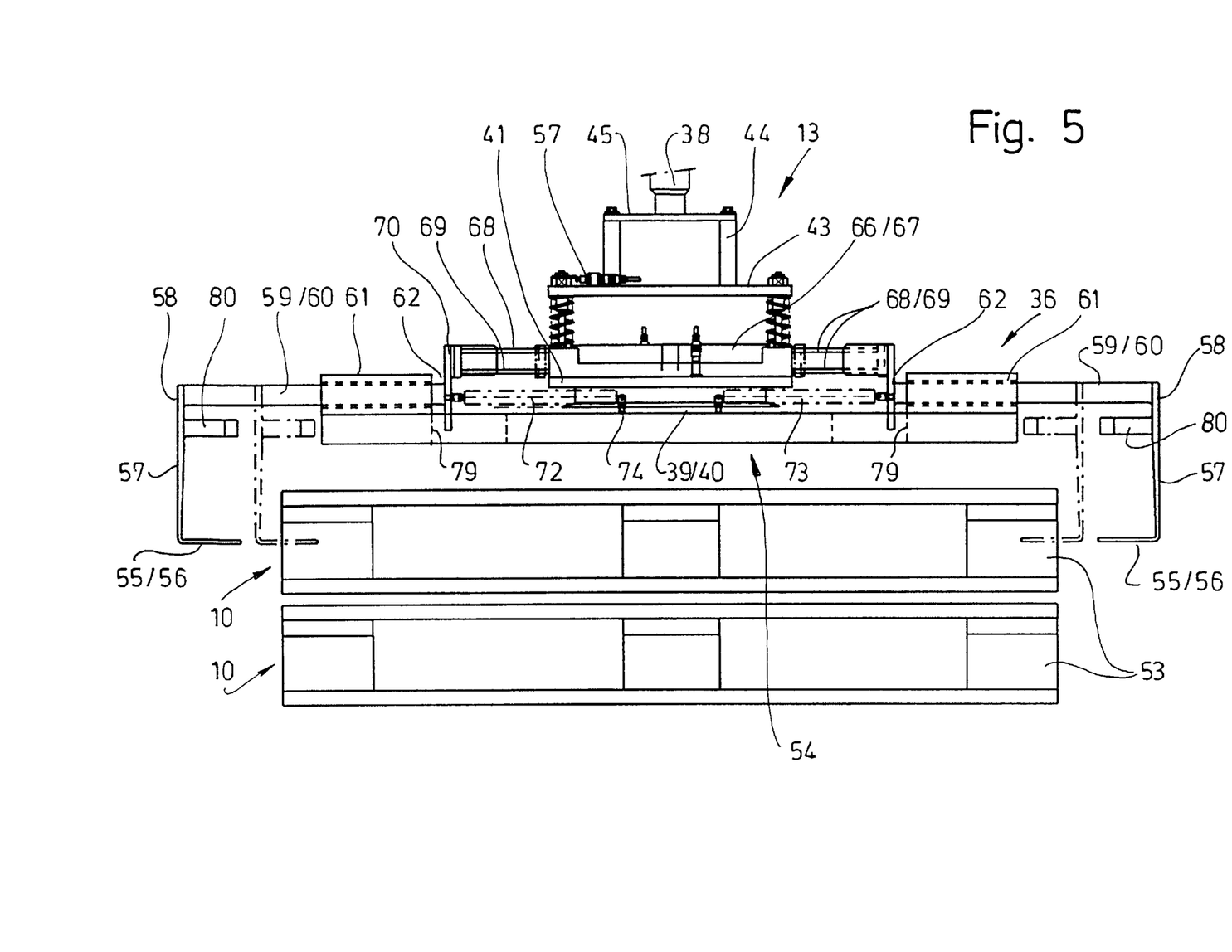
Figure 6:
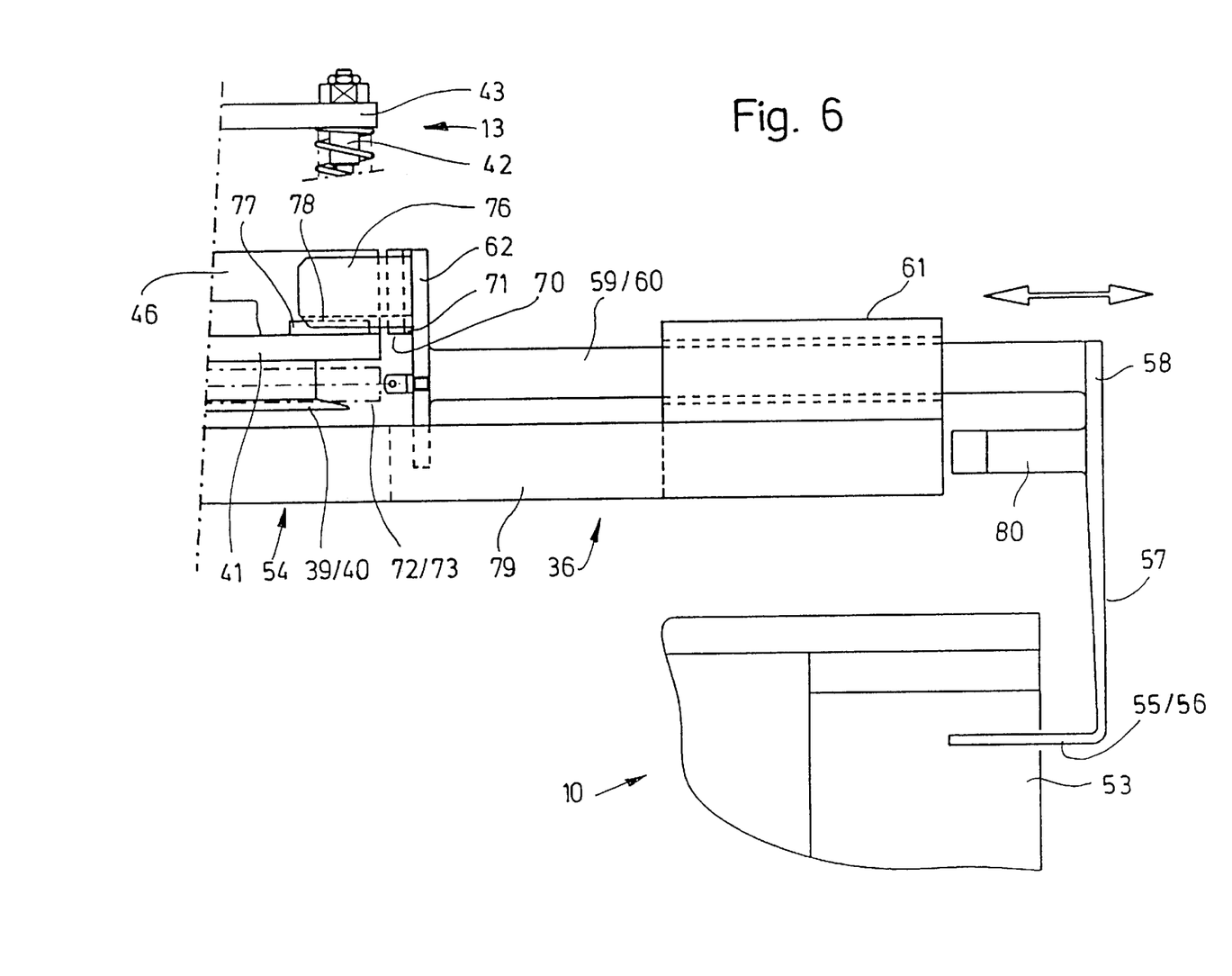

The pallet grab 36 is grasped by the holding members present on the lifting head 13, namely suction strips 39, 40, and held on the lifting head 13. The suction strips 39, 40 act here on the upper side of the plate-shaped carrying unit 54, exactly in the central region, so that the pallet grab 36 hangs on the lifting head 13 in a balanced position. In the present case, there is a borehole 63 in the carrying unit 54, which borehole is allocated to one of the sensors 49, 50. In this way, when the pallet grab 36 is coupled to the lifting head 13, only one of the sensors 49, 50 is activated. For control purposes, a signal arises indicating that a pallet grab 36 is now attached to the lifting head 13.

The grasping members for the pallet 10, i.e. carrying legs 55, 56 may be actuated on this embodiment from the lifting head 13. To this end, pressure medium cylinders 66, 67 are attached to the lifting head 13. These are elongated members which are attached lying beside one another on the upper side of the main plate 41 and act in opposite directions.

The pressure medium cylinders 66, 67 act via piston rods 68, 69 on the grasping members. In the present example, there are allocated to each pressure medium cylinder 66, 67 two parallel piston rods 68, 69, the free ends of which are connected to one another via a pressure plate. The latter acts as a plunger as the grasping members, i.e. carrying legs 55, 56, are displaced. The pressure plate 70 is driven by the outward movement of the piston rods 68, 69 against the respectively allocated butt plate 62. The pressure plate 70 has on its free outer side a resilient pad 71 which comes into contact with the butt plate 62. In FIG. 2, the extended position of the pressure plate 70 is shown with unbroken lines and the retracted position is shown in dot-dash lines.

The pressure medium cylinders 66, 67 or the pressure plates 70 only act in one direction, namely extending and spreading out, on the grasping members of the pallet grab 36. Movement in the opposite direction is effected in the present case by a return member turned towards each grasping member or each pair of carrying legs 55, 56. These return members are tension springs 72, 73 which are permanently arranged on the pallet grab 36, namely on the upper side of the carrying unit 54. One end of the tension springs 72, 73 is connected to the butt plate 62 for the stay bars 59, 60. The other end of the tension springs 72, 73 is connected via a holding member 74 to the carrying unit 54. The tension springs are stretched by the piston rods 68, 69 being extended. When the piston rods 68, 69 are drawn in, the tension springs 72, 73 pull the grasping member, namely the carrying legs 55, 56 into the grasping position on the pallet 10 (shown by dot-dash lines in FIG. 5). As the pallet 10 is released, namely as it is set down in the region of the pallet station 22 . . . 25, the movements correspondingly occur in the opposite direction.

The holding power of the suction strips 39, 40 for the pallet grab 36 on the lifting head 13 can be guaranteed or replaced by additional coupling members. In the present embodiment these consist of carrying blocks 75, 76 on the pallet grab 36. These carrying blocks 75, 76 are brought into a positively-engaging connecting position with the lifting head 13, in the present case in the (driven-in) grasping position of the pallet grab 36 (shown by dot-dash lines in FIG. 5 or the position according to FIG. 6). A carrying block 75, 76 is attached to each butt plate 62 on the side turned towards the lifting head 13. When the grasping members are pulled in, i.e. when the butt plates 62 are returned by the tension springs 72, 73, the carrying block 75, 76 is driven into a position above the main plate 41 (position according to FIG. 6). As the lifting head 13 rises, the carrying block 75, 76 is placed on the upper side of the main plate 41 and thus transmits the weight forces of the pallet grab 36 completely or partially to the lifting head. In order to achieve an exact position, a feather key 77 is attached to the upper side of the main plate 41 in the movement area of the carrying blocks 75, 76. A groove 78 on the underside of carrying blocks 75, 76 engages with the feather key 77 and thus effects additional adjustment between the lifting head 13 and the pallet grab 36.

The plate-shaped carrying unit 54 of the pallet grab 36 is provided with recesses 79. A lower region of the butt plate 62 enters these recesses during the backward and forward movements. In addition, spacers 80 are arranged on the web 57 or on the crosshead 58. These, against the force of the tension springs 72, 73, determine the grasping position of the carrying legs 55, 56 through contact with the carrying unit 54.

The pallet grab 36 is only used from time to time, namely connected to the lifting head 13. During the predominant process of loading the pallet by means of the lifting head 13, the pallet grab 36 is positioned in a storage station 81. This consists of the table-like support structure 37 with a bearing plate 82. The pallet grab 36 rests on same, in an exactly aligned position.

Support structure 37 and pallet grab 36 are adjusted to one another for an exact relative position which can be achieved automatically. On the upper side of the bearing plate 62 there are attached fixed adjusting members, namely centering blocks 64, 65 and position blocks 64, 65 lying respectively opposite one another. The above-mentioned blocks have slanted faces 85 turned respectively towards each other, which make easier the independent alignment of the grasping unit 36 on the support structure 37.

The centering blocks 64, 65 arranged in pairs on transverse edges of the bearing plate 82, enter the respectively allocated recess 79 of the plate-shaped carrying unit 54. Edge boundaries 86 of the recesses 79, turned towards one another, form a centering or bearing surface for the centering blocks 64, 65 in the longitudinal direction of the pallet grab 36.

In the transverse direction, the position blocks 83 and 84 act on longitudinal edges of the carrying unit 54. The pallet grab 36 is thereby reliably positioned exactly on the support structure 37, so that the correspondingly controlled palletizing device 11 or its lifting head 13 can grasp the pallet grab 36 exactly.

The centering blocks 64, 65 entering the recesses 79, serve at the same time as a support for the butt plates 62 of the stay bars 59, 60. The butt plates 62 are drawn by the tension springs 72, 73 against the centering blocks 64, 65. When the pallet grab 36 is in its waiting position on the support structure 37, the grasping members, namely the carrying legs 55, 56, are therefore in a partially extended position. This position is necessary in order for the lifting head 13 to be able to be moved past the carrying blocks 75, 76 as it picks up the pallet grab 36 by lowering onto the carrying unit 54 of same.

The additional carrier, configured in the present case as a pallet grab 36, can also be designed to receive other objects which from time to time have to be handled within the framework of automatic conveying measures.

We claim:

1. A lifting apparatus having a receiver, said receiver comprising:

a movable lifting head (13) for loading and unloading pallets, said movable lifting head (13) having one or more suction members for grasping objects to be transported;

an additional receiver removably fixed to said lifting head (13) by means of said one or more suction members;

wherein said additional receiver is a pallet grab (36) and has movable grasping members for grasping pallets (10).

2. The lifting apparatus according to claim 1, wherein said grasping members are actuated by actuating members arranged on said lifting head.

3. The lifting apparatus according to claim 1, wherein said lifting head is attached to an articulated extension arm (12) so as to configure the lifting apparatus as a palletizing device (11).

4. The lifting apparatus according to claim 1, wherein the additional receiver has a carrying block mechanical coupling member (75, 76) which couples to said lifting head (13) at a coupling position when said grasping members move into a grasping position.

5. The lifting apparatus according to claim 2, wherein said actuating members comprise:

pressure medium cylinders (68, 69), movable in the horizontal direction, having a piston rods extending outward in opposing directions for actuating said grasping members.

6. The lifting apparatus according to claim 5, wherein said grasping members are mounted in respective guides on said pallet grab such that the grasping members are capable of being driven in and out sideways in a horizontal plane via connection to said piston rods.

7. The lifting apparatus according to claim 1, wherein said grasping members are spring biased so as to move towards one another by tension springs mounted on said pallet grab.

8. The lifting apparatus according to claim 1, wherein said lifting head comprises:

carrying bolts (42);

compression springs (47); and a main plate (41) mounted at a lower portion of said lifting head (13) on said carrying bolts (42), said main plate being spring biased downward by said compression springs (47) so as to be resiliently movable in an upward direction.

* * * * *